Patented Apr. 9, 1935

1,997,326

UNITED STATES PATENT OFFICE 1,997,326

PROCESS FOR THE DIRECT PRODUCTION OF ACETONE-SOLUBLE CELLULOSE ESTERS

Russell H. Van Dyke, Charles S. Webber, and Cyril J. Staud, Rochester, N. Y., assignors to Eastman Kodak Company, Rochester, N. Y., a corporation of New York No Drawing. Application July 15, 1929,
Serial No. 378,557

11 Claims. (Cl. 260—101)

This invention relates to the manufacture of cellulose esters and more particularly to the production of a cellulose ester containing both acetyl radicals and combined nitrogen, which esters we shall hereinafter denominate, for convenience, as cellulose nitro-acetates.

Since the discovery of cellulose acetate by Schutzenberger in 1865 the direct acetylation of cellulose to the point where clear solutions were obtained has always resulted in a product which was insoluble in acetone and soluble in chloroform, chloroform-alcohol, ethylene chloride-alcohol, or 1-4 dioxan. Other solvents were, of course, known but films or threads produced from a solution of cellulose acetate in any of the above solvents or others were brittle and of low tensile strength. They were unsuitable for industrial use.

In 1900 Miles discovered that by the partial hydrolysis of the cellulose triacetate, which was obtained by direct acetylation, a change in the solubility properties of the cellulose acetate was brought about and material which was soluble in acetone was produced. Further hydrolysis resulted in a cellulose acetate which was insoluble in acetone but soluble in still other solvents. Cellulose triacetate contains 44.8% acetyl. The partially hydrolyzed material, soluble in acetone contains about 42 to 36% acetyl. Cellulose acetate containing more than about 42% or less than about 36% acetyl is insoluble in acetone. Not only did the partial hydrolysis induce a change in solubility properties but films or threads coated or spun from acetone or other solvent for this material were found to be much improved in physical properties. Such films and threads were found to be of high flexibility and to possess good tensile strength. It was Miles' invention which brought cellulose acetate into the industrial field.

In 1912 Clement and Riviere described a method by which they claimed to be able to produce a nitro-acetate by first partially nitrating the cellulose and thereafter acetylating such nitro-cellulose for 10 to 20 hours by the use of acetic anhydride in the presence of glacial acetic acid, and sulfuric acid as a catalyst. Clement then hydrolyzed his product to obtain certain solubilities. He combined nitrogen with the cellulose, only in the pretreatment step.

Worden, in his book entitled "Technology of Cellulose Esters" refers to the nitration of cellulose acetates and to the acetylation of cellulose nitrates but describes the processes as ones requiring long reaction periods, and the employment of strong nitric acid during the nitration step. He refers to both the processes and products in somewhat disparaging tones indicating lack of success therewith.

Cellulose acetate is normally produced by the pretreatment of a cellulose, such as cotton linters, with glacial acetic acid to which a small amount of a single or mixed catalyst has been added. It is common practice to vary the time of the pretreatment, as well as the quantity of glacial acetic acid used in the pretreatment, within rather wide limits. For instance, from one to ten parts of acetic acid per part of cellulose may be used and the pretreatment time may be varied from approximately one hour to as high as twenty hours or even more. The quantity of catalyst may also be varied, as well as the temperature of the pretreatment step. In general, the higher the temperature, the shorter the time of pretreatment necessary, although care must be exercised to avoid degradation of the cellulose molecule. It is better that the temperature be not permitted to exceed about 40° C.

Following pretreatment, the temperature of the mixture is usually reduced to approximately 20° C. or less and acetic anhydride (with or without more glacial acetic acid and catalyst) is added, the acetylation reaction being permitted to continue for a period of approximately 18 to 20 hours at about atmospheric temperature (but not usually over 40° C.) whereupon cellulose triacetate soluble in chloroform and having an acetyl content of 44.8 per cent is produced. As is well known, the reaction mixture, time and temperature may be varied considerably. To produce an acetone soluble product, the triacetate must then be hydrolyzed by the addition of water and acetic acid to the reaction mixture. The foregoing methods of producing either chloroform or acetone soluble cellulose acetate are all well known to those skilled in the art and need not be further elaborated upon at this point except to state that by the ordinary acetylating methods, a relatively pure form of cellulose, such as refined cotton linters, must be used.

To probably everyone who has had even a superficial experience in cellulose acetate research has come the idea that the direct acetylation of cellulose to an acetone soluble product would be an advantageous and logical procedure. However, since the discovery of cellulose acetate, the finding or perfection of a method for acetylating cellulose directly to an acetone soluble product has resisted the attempts of all experimenters prior to our work upon this subject.

We have discovered that by employing nitrogen in the form of one of its oxides, such as nitrogen dioxide, during the acetylation of the cellulose by acetylation processes which are otherwise similar in most respects to known acetylation processes that a product may be produced in the remarkably short time of one to four hours or even less, which product we find, much to our surprise, is acetone soluble, is far more viscous than the ordinary hydrolyzed cellulose acetates produced by the usual processes and which product need not be hydrolyzed to give it the desired solubility, as was heretofore found necessary.

It is among the objects of our invention, therefore, to produce by direct nitro-acetylation a cellulose acetate compound containing nitrogen, which product is acetone soluble, without the necessity of subjecting the acetate to a hydrolysis step. It is a further object of our invention to produce a more viscous product than that produced by the usual acetylating methods and to produce such product in a markedly shorter time. Further objects of our invention will be apparent upon a perusal of the accompanying description and claims forming a part hereof.

More particularly we have found that not only those types of cellulose which are normally acetylated may be treated in accordance with our invention but more crude cellulose products, which could not heretofore be successfully acetylated, may also be treated in accordance with our invention for the production of very useful products. As heretofore stated, the pretreatment of the cellulose may be conducted in the usual manner, such as by the addition of glacial acetic acid to the cellulose plus the addition of approximately 10 per cent or less by weight of a catalyst, such as concentrated sulfuric acid. Instead of the single catalyst, a mixed catalyst such as that described by Gray and Staud, Patent No. 1,683,347, may be added during the pretreatment step. As a further variation of the pretreatment step, we may employ glacial acetic acid which has been slightly saturated with nitrogen dioxide or its dimer, as described in Staud and Webber application, No. 328,062, filed December 22, 1928. As a matter of fact, the type of pretreatment step is really immaterial because it is not necessary and, in fact, not even preferable that we treat a pretreated material containing any nitrogen at all. As a matter of fact, should cellulose be pretreated in the presence of a small amount of a nitrogen oxide, as described in the Staud and Webber application, such nitrogen does not "carry through" to the final product when acetylated by the usual methods, as is shown by an analysis of the final product thus acetylated. To whatever pretreated material may be selected for the application of our novel treatment may be added an acetylating bath containing an oxide of nitrogen, as herein described.

Our invention involves the discovery that the addition of a nitrogen oxide, such as nitrogen dioxide or its dimer nitrogen tetroxide, to the acetlyating mixture will produce directly, in a markedly short time, products having high viscosity and which are soluble in acetone. For instance, to the acetic anhydride employed in the acetylating reaction as described in the Gray and Staud patent may be added nitrogen dioxide prior to the addition of the acetic anhydride to the acetylating mixture. We have found upon passing nitrogen dioxide through acetic anhydride that the acetic anhydride will, within a relatively short time, appear to be saturated with nitrogen dioxide as evidenced by the fact that nitrogen dioxide passes off, as such, from the acetic anhydride. At this stage, the acetic anhydride may contain up to approximately 3% of nitrogen dioxide. However, this is merely an indication that the saturation rate of the acetic anhydride has decreased since by continuing the circulation of the $NO_2$ through the acetic anhydride, it will absorb or adsorb or have combined therewith, as much as 25% by weight of nitrogen dioxide. If cellulose, pretreated in one of the usual ways, be subjected to treatment at the normal acetylating temperatures and time with an acetylating mixture containing a quantity of 85% acetic anhydride which has been saturated with a nitrogen oxide, such as nitrogen dioxide, until nitrogen dioxide passes off from the acetic anhydride as described above, a cellulose acetate will be produced which is chloroform soluble and which can be hydrolyzed in the usual way to an acetone soluble product. When this hydrolyzed product is dissolved in a quantity of acetone it will be found to give a much more viscous solution than would the ordinary cellulose acetate; the product so produced, although more viscous, and produced in a shorter acetylating time, does not contain any nitrogen.

However, when acetic anhydride containing, say about 4% or more of a nitrogen oxide is added to the pretreated cellulose with such other compounds as may be desired, such as additional glacial acetic acid and additional catalyst, to form what would otherwise be the usual acetylating mixture, we find to our surprise that the "nitro-acetylation," as it may be termed, of the pretreated cellulose to an acetone soluble "nitro-acetate" product is quite readily accomplished at a temperature in the neighborhood of 40° C. or less in from 1 to 4 hours and in some instances less than 1 hour. Upon attempting to hydrolyze this acetone soluble cellulose nitro-acetate we discovered that it was not hydrolyzable by the ordinary methods but would precipitate out to form a product similar in physical appearance to the usual acetone soluble cellulose acetate heretofore known. We found the products so produced to be soluble not only in acetone but also in other organic solvents, such as chloroform, ethylene chloride, 1-4 dioxan and ethyl acetate. In this connection it is to be noted that few, if any, cellulose acetate products heretofore known, have been soluble in ethyl acetate. Analyses of a number of these novel cellulose nitro-acetate products which we produced indicate that they contain from about .3% to 3% of nitrogen and from about 38% to 42% of acetyl radicals. By increasing the nitrogen dioxide (or other nitrogen oxide) content in the acetic anhydride, the acetyl value of the cellulose may be lowered and the nitrogen value increased, within certain limits, say, to 36% acetyl and 5% nitrogen respectively. When dissolved in a given quantity of acetone we find that our new product is much more viscous than what we might term the corresponding acetone soluble hydrolyzed cellulose acetate, the increase in viscosity being in the order of the ratio of approximately 11 to 4. Films produced from a solution containing our nitro-acetate product are brilliantly transparent and have good flexibility and toughness. Upon comparison of samples of various films of the same size, we find that cellulose nitrate burns in approximately ½ second, cellulose acetate in from 15 to 20 seconds and our novel cellulose nitro-acetate in approximately 12 to 13 seconds; it will be obvious, therefore, that our novel product is substantially as non-inflammable as cellulose acetate and, in fact, no more inflammable than ordinary newsprint paper.

While we do not propose in any way to limit our invention to any theories which may be advanced regarding the reactions which take place during our novel nitro-acetylating method, it seems reasonable to believe that the hydrogen of the hydroxyl groups of the cellulose molecule are simultaneously displaced by acetyl radicals and what we believe to be nitrate radicals. We believe the nitrogen containing radical which combines with the cellulose molecule to be a true nitrate radical although it is possible that it is a nitrite radical. The cellulose molecule is a very difficult one to analyze and we shall, therefore, content ourselves to referring to the nitrogen bearing radical as a nitrate, it being understood that we intend to include in such terminology any other nitrogen bearing radical which combines with the cellulose molecule in the same manner as does the nitrate radical. The acetyl radicals being more reactive than the nitrate radicals, and also being in a predominating proportion, substitute for the hydrogen of the hydroxyl radicals in a predominating proportion. The theory might be advanced that the nitrogen inhibits the attachment of a full 44.8% of acetyl radicals with the subsequent or simultaneous attachment of a small proportion of nitrate radicals, or that a cellulose triacetate is quickly formed and later partially broken down by the nitrogen dioxide to permit the substitution of a small proportion of nitrate radicals. We favor, however, the first theory advanced, as it appears to be more in harmony with the results actually obtained, although it will be obvious that we are not to be bound in any way thereby, as we have quite adequately disclosed the manner in which our invention may be practiced and an understanding of the theory of the cellulose molecule is not essential but merely interesting.

Although the description of our novel process and product as set forth above would enable those skilled in the art to carry it out, it is thought well to give the following specific examples, by which, of course, we shall not be bound in any way as a limitation of our broad invention. For example, 50 grams of cotton linters may be placed in 350 grams of glacial acetic acid and containing 2 ccs. of 1:3 mixed catalyst ($H_2SO_4$ and $H_3PO_4$) such as described in the Gray and Staud patent above mentioned. The temperature is maintained at approximately 37° C. for about 4 hours after which 140 ccs. of 85% acetic anhydride containing in solution approximately 8 grams of nitrogen dioxide, or its dimer nitrogen tetroxide. The reacting mass is then agitated for 3 hours in any suitable temperature regulating bath having an initial temperature of 18° C., the bath temperature being gradually increased to from 40° to 45° C. The product so obtained is precipitated in water, washed and dried in the usual manner and found to be soluble in acetone as described above and to produce a dope of high viscosity, brilliant clarity and good color. If it be desired to utilize more nitrogen dioxide the nitro-acetylating time can thus be reduced, for instance, the nitro-acetylation step may be accomplished in approximately one and one half hours under approximately the same conditions above described if the 140 ccs. of acetic anhydride added be first permitted to absorb in the neighborhood of 14 grams or 10% of nitrogen dioxide.

The nitro-acetylation time can also be further decreased by further increasing the nitrogen dioxide content of the anhydrid and/or by increasing the pretreatment time. For instance, the conditions first above described may be altered only to the extent that the pretreatment time is lengthened to 8 hours and the nitrogen dioxide content of the 140 grams of acetic anhydride is increased to 18 grams whereupon the nitro-acetylating time may be decreased to approximately one half hour.

If, as referred to earlier in this specification, it should be desired to increase the viscosity of the final product but not by direct nitro-acetylation produce an acetone soluble product the nitro-acetylation may be conducted in the usual ways for 4 to 8 hours with the additional aid only of acetic anhydride containing up to approximately 3% of nitrogen dioxide or about 4 grams of nitrogen dioxide per 140 ccs. of acetic anhydride. The thus acetylated product is chloroform soluble but must be partially hydrolyzed to obtain acetone solubility. Hydrolysis is accomplished in 24 hours at 50° C. by addding to the dope thus far produced, 26 ccs. of water, 2.2 grams of sodium bisulphate monohydrate and 40 ccs. of glacial acetic acid after which an acetone soluble product may be precipitated in water.

As hereinbefore referred to, other pretreatment conditions can be employed without appreciably affecting the final product. Varying proportions of a single or mixed catalyst may be employed as well as different proportions of glacial acetic acid, and acetic anhydride having nitrogen dioxide in solution therein. Reaction temperatures and times may be varied in accordance with known practice for producing known effects. We have found it preferable to employ acetic anhydride which has been permitted to absorb approximately 4% or more of nitrogen dioxide. In fact, acetic anhydride which has been permitted to absorb as much as 20 to 25% of its weight in nitrogen dioxide, or its dimer, may be employed with success. Of course, should twice the amount of acetic anhydride be employed containing a lesser concentration of nitrogen dioxide than that specified by us as being desirable, the total nitrogen dioxide present in the mixture might be sufficient to carry out the process, although we prefer to employ the usual proportions of acetic anhydride known to those skilled in the art and to saturate that acetic anhydride with approximately 4% or more of nitrogen dioxide.

Other methods of introducing the nitrogen dioxide into the acetylating mixture may also be employed. For instance, the glacial acetic acid which is added to the acetylating mixture might alternatively or additively be saturated with nitrogen dioxide in order to supply that element to the acetylation mixture. Other cellulose acetate solvents, or non-solvents which with acetylating mixtures become solvents, which are sometimes employed in the acetylating bath may be saturated with nitrogen dioxide in order to convey the nitrogen dioxide into the acetylating bath so long as the nitrogen dioxide is compatible therewith.

Also it has been known that cellulose may be acetylated by the use of acetic anhydride in the presence of a non-solvent such as carbon tetrachloride. Our novel cellulose nitro-acetates may be produced by saturating with nitrogen dioxide the carbon tetrachloride used in the above method of acetylating.

Also to those acetylating mixtures known to those skilled in the art may be added nitrogen dioxide in the form of the gas being bubbled through the acetylating mixture to accomplish our nitro-acetylation.

Numerous other methods of introducing nitrogen dioxide into the acetylating mixture may occur to those skilled in the art and it is to be understood that our invention is to be limited only by the claims appended hereto and forming a part hereof.

In a similar way to that described above we may form other nitro-acyl compounds by using the acyl (or fatty) acid and the acyl anhydride corresponding to the acylate which it is desired to combine with the cellulose. For instance, propionic anhydride may be employed in place of acetic anhydride should it be desired to produce cellulose nitro-proprionate; butyric anhydride may be similarly employed to produce the nitro-butyrate although it is difficult to produce nitro-acylates where the corresponding anhydride contains more than six carbon atoms. In producing these higher nitro-acylates, glacial acetic acid may be employed, or the acid corresponding to the acylate to be produced. As the number of carbon atoms of the acid or anhydride increase the reaction rate is, of course, slightly slower.

Although, we have described our invention as being used to produce cellulose nitro-acetate from cellulose in the form of cotton linters, we have found that numerous other forms of cellulose may be similarly treated. For instance, scrap cotton cloth, long fibered cotton, alpha cellulose, linters containing more or less of the so-called beta and gamma cellulose, and high grade wood pulps, such as sulphite pulp and super-alpha pulp, may also be treated with good results in accordance with our invention. We have even found that crude celluloses, such as crude cotton linters, may be treated in accordance with our invention for the production of quite useful products—something which to our knowledge has never been done heretofore. The shives and resinous impurities in such a crude product will not, of course, be completely converted and will give to the product thus produced, a coloration in the nature of an amber tone or even darker. Following nitro-acetylation, however, if these resinous bodies be filtered off from a solution of the nitro-acetate, a product will be yielded which, although having a color, will be good in flexibility and can be used for such things as lacquers where a pigment darker than the color of the nitro-acetate is to be used anyway. A cellulose ester which can more readily compete with cellulose nitrate, can thus be produced.

Although our novel cellulose nitro-acetates may be produced with greater facility when the pretreatment step is employed we have found that by employing a longer nitro-acetylating time that nitro-acetates of good quality may be produced. For instance, we may take 50 grams of cotton linters and add thereto some 350 grams of glacial acetic acid, 2 ccs. of 1:3 mixed catalyst ($H_2SO_4$ and $H_3PO_4$) and about 140 ccs. of 85% acetic anhydride which has been saturated with a nitrogen oxide, such as nitrogen dioxide or its dimer nitrogen tetroxide, to the extent of approximately 4% or more of nitrogen oxide content (by weight). The mixture is permitted to nitro-acetylate at a gradually increasing temperature ranging from 20 to 50° C. for from 24 to 48 hours whereupon a cellulose nitro-acetate soluble in acetone is directly produced. The product may be precipitated in water and when put in solution in acetone may be deposited in a film having clarity, flexibility and noninflammability characteristics similar to those of the nitro-acetates hereinbefore described which were produced after pretreatment. Thus, even by direct nitro-acetylation without pretreatment we can produce an acetone soluble cellulose ester of good quality in no greater time, certainly, than an acetone soluble acetate was heretofore produced, and with less steps and equipment.

Our novel cellulose nitro-acetates may be combined with other materials and utilized in a manner similar to the utilization of the ordinary type of cellulose acetates. As before stated our nitro-acetates are soluble in either chloroform, acetone, ethylene chloride, 1-4 dioxan or ethyl acetate. To such solutions of our nitro-acetates may be added the usual cellulose acetate plasticizers which are compatible therewith, such as triphenyl phosphate, monochlornaphthalene, etc. The usual inflammability reducing agents, solvent evaporation retardants and flexibility inducing agents normally employed in cellulose acetate solutions may also be employed in solutions of our novel nitro-acetates so long as such agents are compatible with the solvent used, all of which will be apparent to those skilled in this art. Our nitro-acetates may be employed in the production of films for various purposes, such as photographic films, artificial silk threads, lacquers and for other products, such as molded articles. In addition to its great utility for producing a photographic film support or backing, our novel product has peculiar adaptability, because of its high viscosity, for the production of artificial silk threads by the usual methods. Because of the great variety of solvents in which our products are soluble they may be quite readily adapted to the spinning of artificial silk fibers. To a solution of the product in one of the solvents mentioned may, of course, be added such evaporation retardants or other agents as may be desirable and, compatible, for making a suitable artificial silk fiber spinning solution.

It will be observed, therefore, that there are many advantages attendant upon our invention, both from the process and product standpoint. For instance, where it has heretofore required an acetylation time of some 18 to 20 hours to produce chloroform soluble cellulose triacetate and then a hydrolysis step in addition to produce acetone soluble cellulose acetate, we have found that a cellulose nitro-acetate which is soluble in acetone as well as a number of other common and economical solvents may be produced directly by a nitro-acetylation reaction consuming in some instances less than an hour and at times as low as 30 minutes without employing such excessively high temperatures as would degrade the cellulose molecule. Thus the equipment necessary to produce the same tonnage of material is reduced by approximately ½ to 1/50 and the raw materials "tied up" in process are reduced to a similarly marked degree. Accompanying these savings must, of course, follow a great saving in the invested capital required to produce an acetone soluble cellulose derivative by our process.

It is also possible to reduce the amount of labor required to produce the same tonnage of material as, in view of the short reaction time required, the process may be made a continuous one.

As evidenced by a comparison of the prior art referred to in the foregoing part of this specification with our invention as set forth herein, we have made the broad discovery that valuable cellulose derivatives in the form of cellulose nitro-acetate may be produced by the employment of nitrogen dioxide, or its dimer during the acetylation reaction. Accordingly, we desire to be accorded all reasonable equivalents within the scope of the claims appended hereto and as denoted by the foregoing specification. In the claims, where nitrogen dioxide is referred to it shall be understood to include its dimer nitrogen tetroxide, which will convert itself to nitrogen dioxide. These, as well as others, come within the nomenclature "a nitrogen oxide" or "an oxide of nitrogen". This conversion of nitrogen oxides to nitrogen dioxide quite readily occurs as the dioxide is the most stable of the nitrogen-oxygen compounds.

What we claim as our invention and desire to be secured by Letters Patent of the United States is:

1. In a process for the esterification of cellulose to an acetone soluble product, the step which comprises conducting the esterification in the presence of a sufficient amount of an oxide of nitrogen which will assure the presence of an appreciable amount of nitrogen di-oxide until an acetone soluble cellulose derivative is produced.

2. In a process for the direct nitro-acetylation of cellulose to an acetone soluble cellulose nitro-acetate, the step which comprises acetylating the cellulose in the presence of a sufficient amount of an oxide of nitrogen which will assure the presence of an appreciable amount of nitrogen di-oxide, until a product is produced having an acetyl content of from 36 to 42%.

3. In a process for the direct nitro-acetylation of cellulose to an acetone soluble cellulose nitro-acetate, the step which comprises acetylating the cellulose in the presence of a sufficient amount of an oxide of nitrogen which will assure the presence of an appreciable amount of nitrogen di-oxide, until a product is produced having an acetyl content of from 36 to 42% and a nitrogen content of from .3 to 3%.

4. The process of nitro-acetylating cellulose which comprises treating the cellulose with a nitro-acetylating mixture at least one component of which has been partially saturated with an appreciable amount of nitrogen dioxide.

5. The process of nitro-acetylating cellulose which comprises treating the cellulose with a nitro-acetylating mixture containing acetic anhydride which has been partially saturated with an appreciable amount of nitrogen dioxide.

6. The process of nitro-acetylating cellulose which comprises treating the cellulose with a nitro-acetylating mixture containing acetic anhydride which has been saturated with nitrogen dioxide until it contains approximately 4% or more of nitrogen oxide.

7. The process of producing an acetone-soluble cellulose ester which comprises pretreating the cellulose with at least sufficient glacial acetic acid to wet the cellulose and a catalyst, adding acetic anhydride which has been partially saturated with a sufficient amount of an oxide of nitrogen which will assure the presence of an appreciable amount of nitrogen di-oxide and maintaining the mixture at reaction temperature until an acetone-soluble cellulose nitro-acetate is produced.

8. The process of producing an acetone-soluble cellulose ester which comprises pretreating the cellulose with at least sufficient glacial acetic acid to wet the cellulose and a catalyst, adding acetic anhydride which has been partially saturated with an oxide of nitrogen in an amount sufficient to assure the presence of an amount of nitrogen di-oxide equal to about 4% or more of the weight of the acetic anhydride and maintaining the mixture at reaction temperature until an acetone-soluble cellulose nitro-acetate is produced.

9. The process of producing an acetone-soluble cellulose ester which comprises pretreating the cellulose with at least sufficient glacial acetic acid to wet the cellulose and a catalyst, adding acetic anhydride which has been partially saturated with a sufficient amount of an oxide of nitrogen which will assure the presence of an appreciable amount of nitrogen di-oxide, and precipitating the nitro-acetate in an aqueous bath.

10. The process of producing an acetone-soluble cellulose ester which comprises pretreating the cellulose with at least sufficient glacial acetic acid to wet the cellulose and a catalyst, adding an acetyl-containing mixture at least one component of which has been partially saturated with a sufficient amount of an oxide of nitrogen which will assure the presence of an appreciable amount of nitrogen di-oxide, and maintaining the mixture at reaction temperature until an acetone-soluble cellulose nitro-acetate is produced.

11. A process for the direct esterification of cellulose to an acetone-soluble cellulose nitro-acetate which comprises pretreating the cellulose in a bath containing acetic acid and a catalyst and subsequently acetylating the pretreated material in an acetylation mixture comprising acetic anhydride partially saturated with a substantial amount of an oxide of nitrogen which will assure the presence of an appreciable amount of nitrogen di-oxide, a catalyst and acetic acid until the resulting product is soluble in acetone.

RUSSELL H. VAN DYKE.
CHARLES S. WEBBER.
CYRIL J. STAUD.

CERTIFICATE OF CORRECTION.

Patent No. 1,997,326.   April 9, 1935.

RUSSELL H. VAN DYKE, ET AL.

It is hereby certified that error appears in the printed specification of the above numbered patent requiring correction as follows: Page 5, second column, line 52-53, claim 11, for "substantial" read sufficient; and that the said Letters Patent should be read with this correction therein that the same may conform to the record of the case in the Patent Office.

Signed and sealed this 21st day of May, A. D. 1935.

Leslie Frazer
Acting Commissioner of Patents.

(Seal)